United States Patent [19]
Helot

[11] Patent Number: 6,091,602
[45] Date of Patent: *Jul. 18, 2000

[54] COMPUTER DOCKING STATION FOR HORIZONTAL OR VERTICAL POSITIONING

[75] Inventor: Jacques H. Helot, Corvallis, Oreg.

[73] Assignee: Hewlett-Packard Company, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/726,068

[22] Filed: Oct. 3, 1996

[51] Int. Cl.[7] .................................. G06F 1/16; H05K 7/10
[52] U.S. Cl. ............................................................ 361/686
[58] Field of Search ........................ 364/708.1; 361/683, 361/686

[56] References Cited

U.S. PATENT DOCUMENTS

| | | | |
|---|---|---|---|
| D. 331,570 | 12/1992 | Kolwa | D14/100 |
| 5,187,645 | 2/1993 | Spalding et al. | 361/686 |
| 5,192,046 | 3/1993 | Howard | 248/676 |
| 5,248,193 | 9/1993 | Schlemmer | 312/223.2 |
| 5,363,273 | 11/1994 | Ma | 361/686 |
| 5,369,549 | 11/1994 | Kopp et al. | 361/679 |
| 5,436,857 | 7/1995 | Nelson et al. | 364/708.1 |
| 5,619,397 | 4/1997 | Honda et al. | 361/686 |
| 5,687,060 | 11/1997 | Ruch et al. | 361/686 |

FOREIGN PATENT DOCUMENTS

| | | | |
|---|---|---|---|
| 0635777A1 | 1/1995 | European Pat. Off. | G06F 1/16 |
| 19516620 | 10/1996 | Germany | G06F 1/18 |
| 06202760 | 7/1994 | Japan | G06F 1/16 |

*Primary Examiner*—Lynn D. Feild

[57] ABSTRACT

A computer docking station for docking a portable computer has an enclosure with a top, a bottom, a front, a back, and two opposing sides. A docking slot is formed between the top and bottom of the enclosure and is continuously open to the front and to one of the sides of the enclosure. The docking slot is sized to receive the portable computer, which may be inserted from the front, side, or diagonally. The docking slot has a width and depth such that the portable computer projects from the front and side of the docking station when docked. In this manner, modules exposed on the front and side of the portable computer are both equally accessible when the portable computer is docked. The docking station may be oriented horizontally or vertically according to user preference. A detachable foot can be employed to help support the docking station in the vertical position. The docking station has an electronic interface port to electronically interconnect with the portable computer when the portable computer is docked. The interface couples the portable computer to a primary circuit card, such as a PCI bus card, mounted within the docking station. The circuit card is aligned in a front to back orientation.

19 Claims, 5 Drawing Sheets

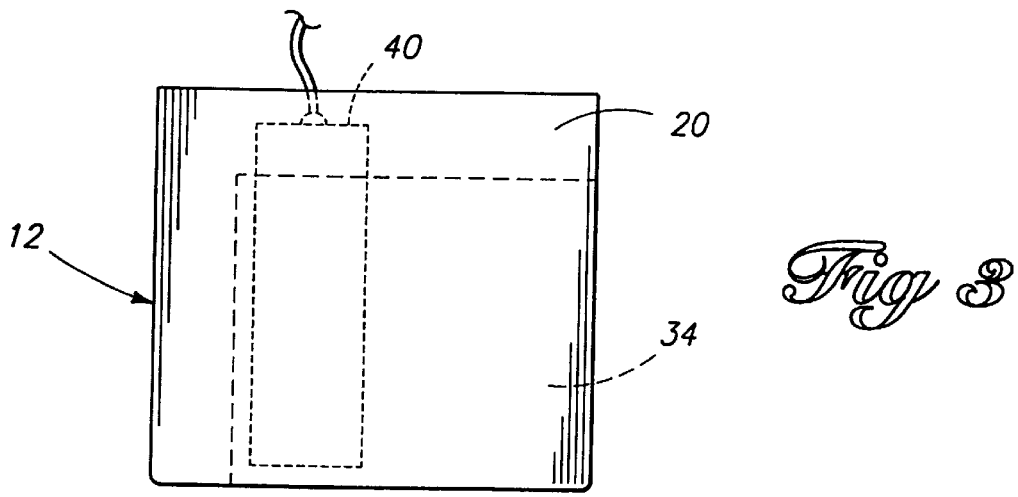
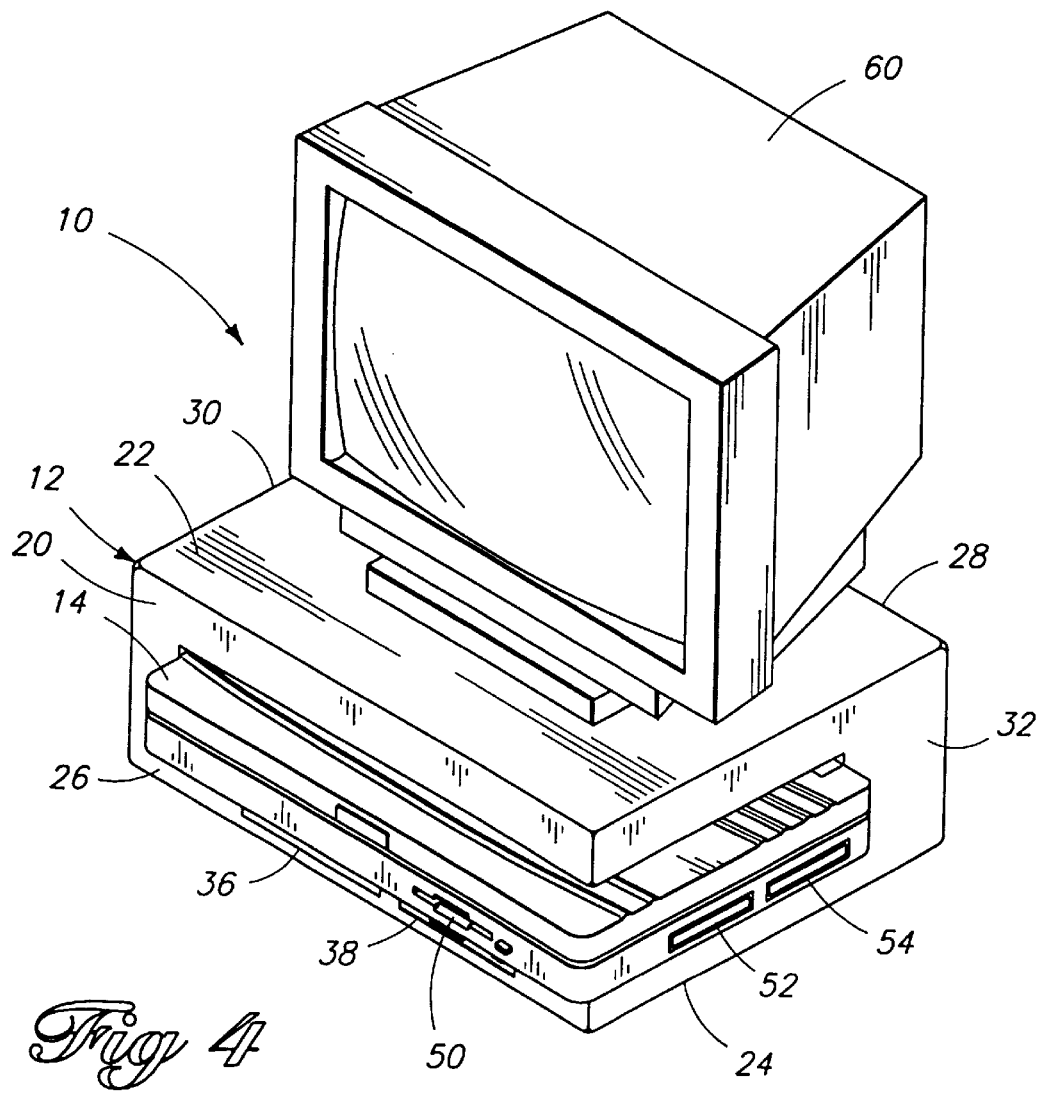

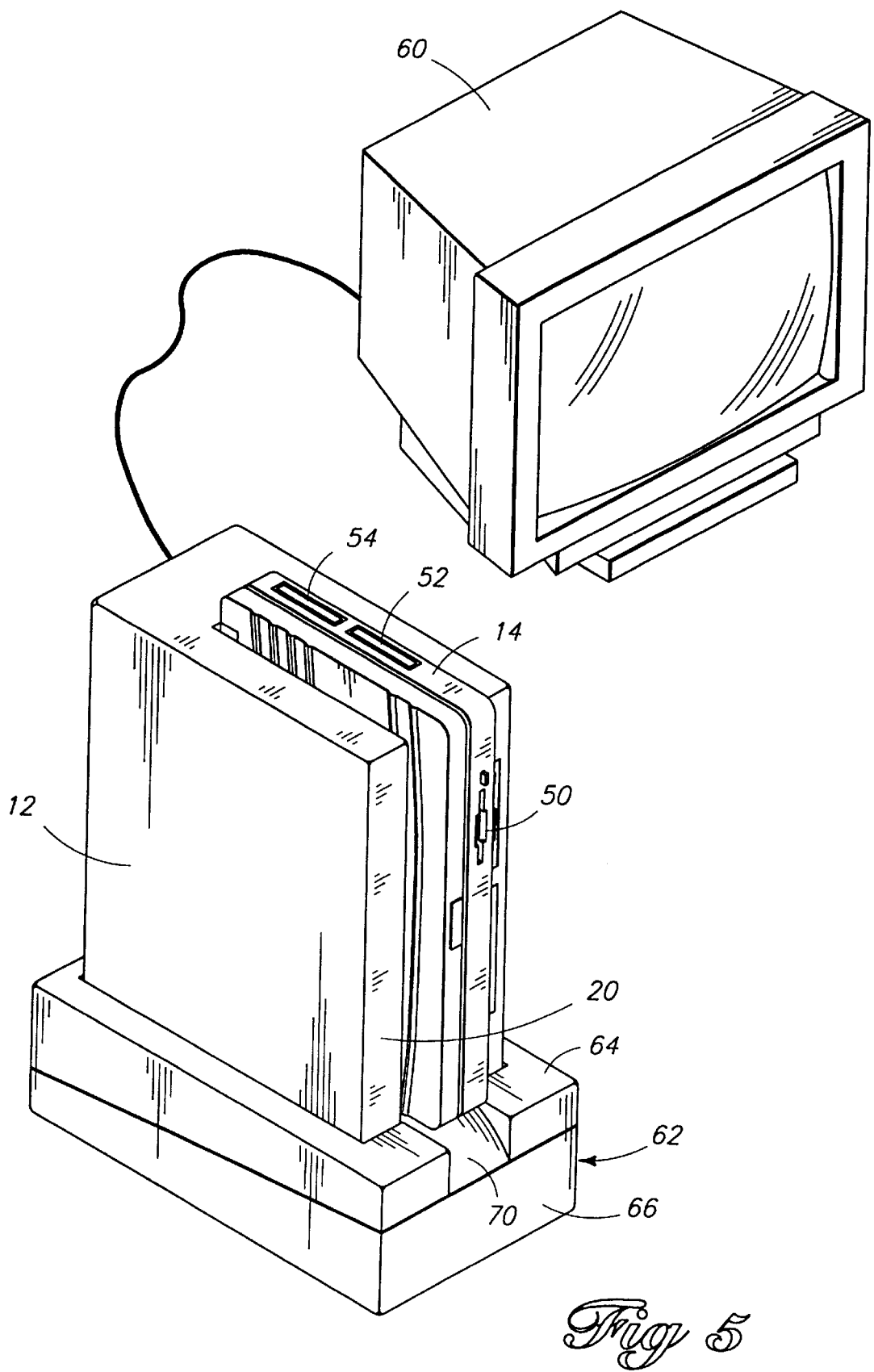

COMPUTER DOCKING STATION FOR HORIZONTAL OR VERTICAL POSITIONING

TECHNICAL FIELD

This invention relates to computer docking stations.

BACKGROUND OF THE INVENTION

The popularity of portable computers has been increasing at a rapid pace. One reason for the portable boom is that computer users are increasingly mobile. They want to port their documents, schedules, spreadsheets, and essentially their entire "office" when they travel. Another reason for the growing popularity is that portable computers very powerful, often rivaling the capabilities of conventional desktop computers. For instance, laptop computers are often available with the same microprocessors, the same memory capacity, and the same accessories as desktop computers, yet the portables are lightweight and compact. The ability to carry a power computing device that offers a full range of functions is very appealing to the traveling professional.

Despite these advantages, the portable computer fails to match the desktop computer in the area of user comfort and ergonomics. By necessity, portable computers are small, thin, lightweight machines that users can slide easily into their briefcases. As a result, the keyboards and displays are smaller and less ergonomically comfortable to use. While appealing for travel and portability, the portable computer has not been widely adopted as the computer of choice for desktop use.

The minor inconveniences of portable computers have been somewhat alleviated with the advent of docking stations. A docking station is designed to adapt a portable computer for stationary desktop use by facilitating an interface to a large CRT monitor (e.g., VGA) and a normal size or ergonomic keyboard. The docking station, CRT, and keyboard permanently reside on the user's desk. When working at his/her desk, the user docks the portable computer at the docking station and uses the CRT and large keyboard. The portable computer is physically loaded into the docking station in its closed position and electronically interfaced to control the peripherals, such as the monitor, keyboard, a CD-ROM drive, a printer, and so forth. In this manner, the portable computer operates as the central processing unit (CPU), with the docking station providing support capabilities for the peripherals. When the user leaves, he/she simply undocks the portable computer from the docking station.

A computer assembly consisting of a portable computer and docking station offer advantages over the portable and desktop computers. The computer assembly is more comfortable to operate than a portable computer because of the ability to use a large monitor and keyboard. The computer assembly is more convenient than desktop computers because of the portability aspect.

Conventional docking stations are designed to set horizontally atop a desk to support the CRT monitor, in the same manner as CPU enclosures of desktop personal computers. For some users, this arrangement elevates the CRT monitor too high for comfortable viewing. In such situations, the user moves the CRT monitor beside the docking station on the desk, consuming precious desktop area.

Another problem with conventional docking stations is that they prevent access to certain modules of the portable computer. It is common to position one or more drivers for PC Card (formerly known as PCMCIA cards), a phone jack, and other modules along the side of a portable computer. When the portable computer is docked, these modules need to be accessible.

The inventor has recognized these problems and has developed a docking station that can be positioned horizontally or vertically according to user preference, without sacrificing ergonomic comfort when docking the portable computer, and while maintaining accessibility to side positioned modules.

SUMMARY OF THE INVENTION

A computer docking station for docking a portable computer has an enclosure with a top, a bottom, a front, a back, and two opposing sides. A docking slot is formed between the top and bottom of the enclosure and is open to the front and to one of the sides of the enclosure. The docking slot is sized to receive the portable computer, which may be inserted diagonally through the open front and side. The docking slot has a width and depth such that the portable computer projects from the front and side of the docking station when docked. In this manner, modules positioned on the front of the portable computer (e.g., CD-ROM, floppy disk drive, hard disk drive) and modules positioned on the side of the portable computer (e.g., PC card drive, telephone jack) are both equally accessible when the portable computer is docked.

The docking station may be oriented horizontally or vertically according to user preference. A detachable foot can be employed to help support the docking station in the vertical position. In one implementation, the detachable foot has a guide groove which aligns with the docking slot to guide the portable computer into the enclosure.

In the horizontal position, the docking slot opens to the front and side. In the vertical position, the docking slot opens toward the front and upwards. Both positions permit easy insertion of the portable computer.

The docking station has an electronic interface port to electronically interconnect with the portable computer when the portable computer is docked. The primary circuit card, such as a PCI bus card, is mounted within the docking station in a front to back orientation rather than side to side. With this card orientation, the enclosure can be made less wide and the cables connecting to the card can extend out the back of the docking station, thereby facilitating a vertical positioning of the docking station.

BRIEF DESCRIPTION OF THE DRAWINGS

FIG. 3 is a top view of the docking station which shows a front-to-back alignment of a PCI bus card.

FIG. 4 is an isometric view of the computer docking station in a horizontal position.

FIG. 5 is an isometric view of the computer docking station in a vertical position.

DETAILED DESCRIPTION OF THE PREFERRED EMBODIMENT

Figure 1:
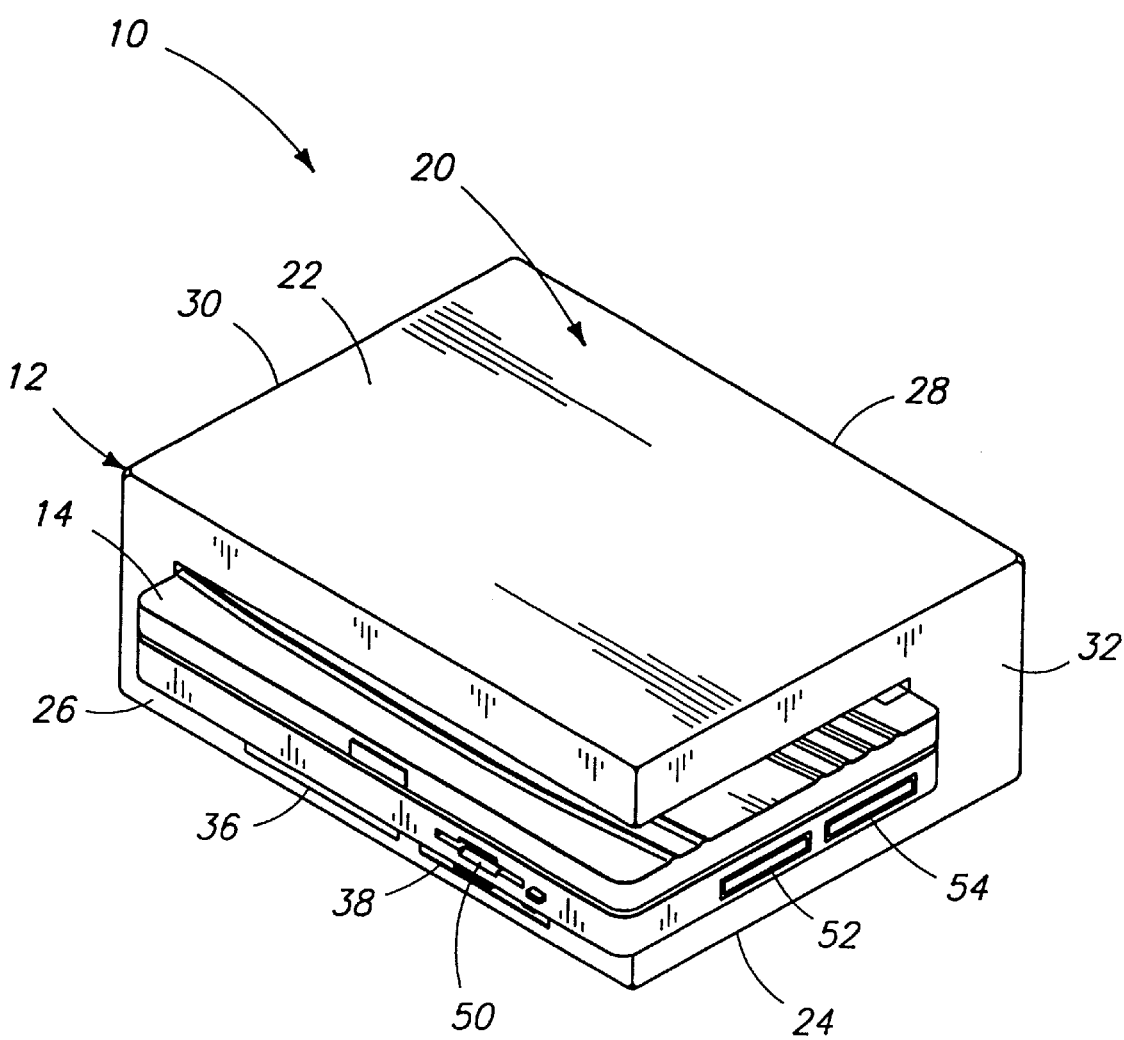
FIG. 1 is an isometric view of a computer docking station and a portable computer docked at the station.
Figure 2:
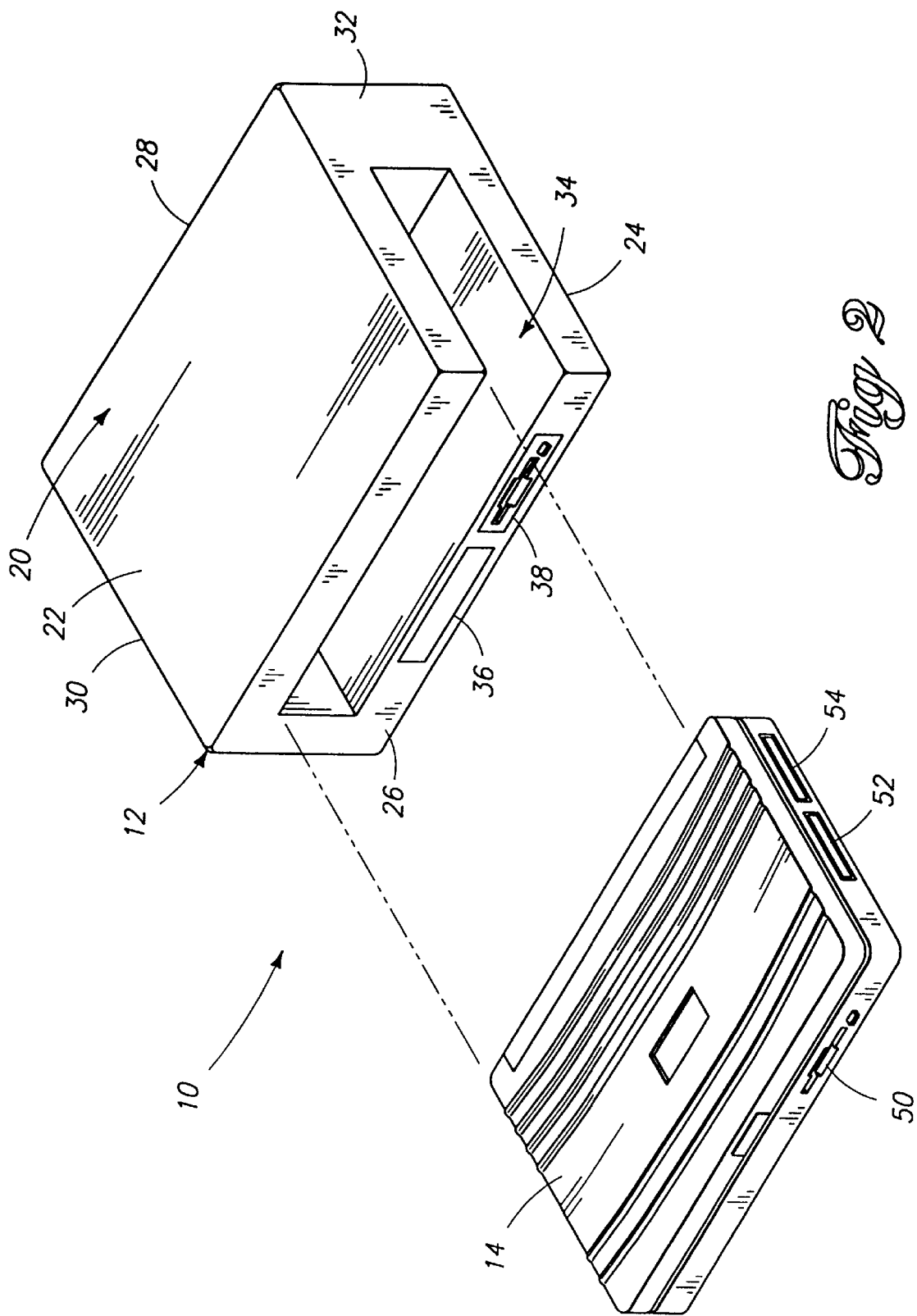
FIG. 2 is an isometric view of the computer docking station with the portable computer undocked from the station.

FIGS. 1 and 2 show a computer assembly 10 constructed according to one implementation. Computer assembly 10 has a docking station 12 and a portable computer 14. The portable computer 14 is illustrated as a laptop computer, although other types of portable computers may be used, such as notebook, sub-notebook, and palmtop computers. The portable computer 14 can be loaded or "docked" within the docking station 12 as illustrated in FIG. 1, or removed or "undocked" from the docking station as illustrated in FIG. 2.

The docking station 12 has an enclosure 20 which houses and protects the electronic circuit boards or cards. The enclosure 20 provides the structural support for physically docking the portable computer 14. The enclosure 20 has a top 22, a bottom 24, a front 26, a back 28, and two opposing sides 30 and 32.

A docking slot 34 is formed between the top 22 and bottom 24 of the enclosure 20. The docking slot 34 has a thickness dimension sized to receive the portable computer 14. The docking slot 34 is open to two faces of the enclosure 20. In the illustrated implementation, the docking slot 34 is continuously open to the front 26 and right side 32. It is noted that the docking slot 34 could alternatively be open to the front 26 and left side 30.

Which side is opened to form part of the docking slot depends partly on the anticipated design of the portable computer. If the portable computer is expected to have modules and/or connectors (e.g., audio jacks, power plug, etc.) positioned along the right side, the docking station is opened on the right side to partly form the docking slot 34. In example construction of FIG. 1, the portable computer 14 is equipped with one module 50 (e.g., a floppy disk drive, hard disk drive, CD-ROM, etc.) positioned on the front of the portable computer and two modules 52, 54 (e.g., PC card drives, phone jack, mouse port, battery, etc.) positioned on the right side of the computer. With this module arrangement, a docking station having a slot opened to the front and right side is appropriate. On the other hand, if the modules are expected to be positioned along the left side of the portable computer, the left side of the docking station is opened to form part of the docking slot 34.

During docking, the user inserts the computer 14 diagonally so that the computer simultaneously enters the docking slot 34 from the front 26 and from the side 32. The computer can also be inserted predominately from the front or predominately from the side. Providing different docking insertion angles is advantageous because the docking station can be arranged in several ways to suit a user's furniture layout.

In the illustrated implementation, the docking slot 34 has a width dimension and a depth dimension such that the portable computer 14 projects from the front and side of the docking station 12 when docked (FIG. 1). The shallow docking slot 34 has two advantages. First, the user can easily grasp the portable computer when docking and undocking the computer. A second advantage is that the modules 50–54 of the computer 14 are easier to access when the computer is docked.

In another implementation, the docking slot 34 may have width and depth dimensions which are greater than or equal to those of the portable computer 14. With these respective dimensions, the computer 14 is either entirely contained within the slot, or is aligned flush with the front and/or side surfaces of the docking station 12. A mechanical or electromechanical ejection device is mounted in the docking station 12 to eject the computer 14 when the user desire to unload the computer from the docking station.

The docking station 12 can be optionally equipped with its own modules. In the illustrated implementation, the docking station 12 has two modules 36 and 38 (e.g., a floppy disk drive, hard disk drive, CD-ROM, etc.) positioned beneath the docking slot 34.

The docking station 12 has an electronic interface port mounted within the docking slot which electronically interconnects with the portable computer 14 when the portable computer is docked. The interface port is preferably located along the back of the slot 34 to engage with a connector in the back of the portable computer. When docked, the portable computer 14 is electronically coupled to one or more printed circuit cards mounted within the enclosure 20. As an example, the docking station has a PCI bus card to facilitate data communication between the computer 14 and the peripherals resident at the docking station (e.g., standalone keyboard, CRT monitor, docking station modules, etc.).

FIG. 3 shows the PCI bus card 40 mounted in the enclosure 20. The circuit card 40 is positioned beneath the docking slot 34 and oriented front to back, as opposed to the traditional side to side orientation in docking stations. This card orientation enables the enclosure 20 to be made more compact because the width dimension (as shown in FIG. 3) can be reduced in comparison to conventional docking stations and PC CPUs. The front-to-back orientation of the card enables any cable(s) connected to the card 40 to extend out the back of the docking station 12, as shown in FIG. 3.

The docking station is designed to be positioned horizontally or vertically, according to the user's preference. FIG. 4 shows the docking station 12 positioned horizontally and FIG. 5 shows the docking station 12 positioned vertically. In the horizontal position (FIG. 4), the docking slot 34 opens to the front and side. The portable computer can be conveniently loaded from the front, side, or diagonally. In the horizontal position, a CRT 60 can be mounted on the top 22 of the enclosure 20.

In the vertical position (FIG. 5), the docking slot 34 opens to the front and upwards. The portable computer can be conveniently loaded from the top, front, or at descending diagonal. In this fashion, the docking station can be positioned in a vertical position under or beside a user's desk and the user can easily slide the portable computer into the docking station from above, or at an angle from the front. It is noted that aligning the PCI card front to back and connecting the cables from the rear of the docking station helps facilitate either horizontal or vertical positioning.

The docking station 12 may be optionally equipped with a detachable foot 62 which is sized to attach to the enclosure 20. The foot 62 supports the enclosure 20 in a vertical position.

Figure 6:
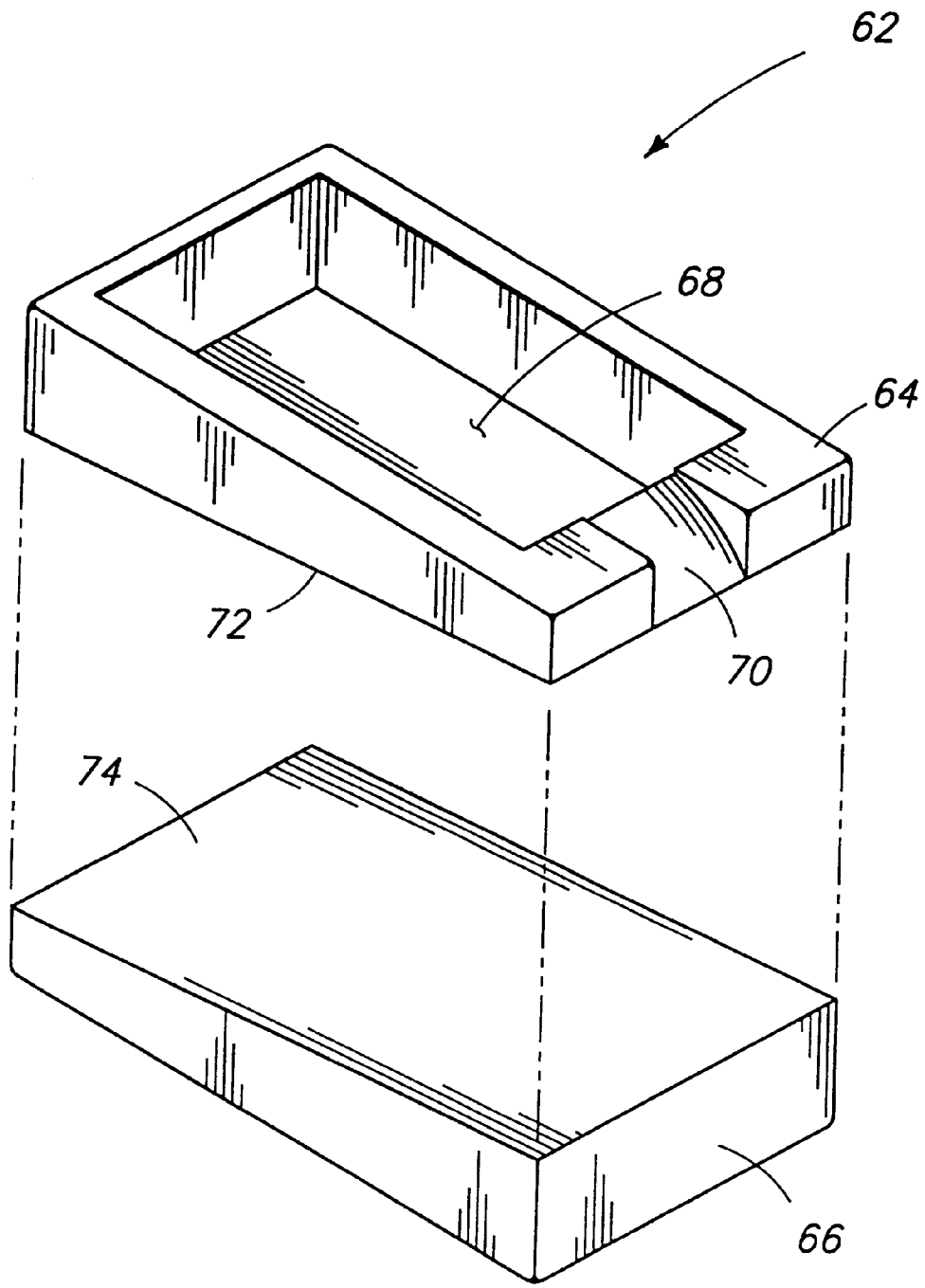
FIG. 6 is an isometric, exploded view of a detachable foot for the docking station.

FIG. 6 shows foot 62 in more detail. It includes an upper member 64 and a lower member 66. The upper member 64 has a recess 68 sized to accommodate one side (i.e., the unopened, left side) of the docking station. A guide groove 70 is formed in the top member 64 to align with the docking slot of the docking station when the docking station is mounted in the recess 68. The alignment relationship is shown in FIG. 5. The guide groove 70 assists the user in docking the computer by guiding a corner or edge of the computer into the docking slot.

The two member foot construction allows the docking station to be mounted vertically atop the desk, or beneath the desk. For mounting beneath the desk, both members 64 and 66 are used. The members 64 and 66 have complementary and inversely slanted non-skid surfaces 72 and 74 which abut one another and frictionally mate when used together. The lower member 66 props the upper member 64 and docking station 12 at a slight upward angle so that the vertically oriented docking station is poised for the user to load the portable computer from above. For vertical mounting on a desktop, the lower member 66 is removed and the upper member 64 tilts the docking station at a slight decline to position the docking slot conveniently for the user to load the portable computer from the front.

It is preferable that only two faces of the enclosure 20 open to form the docking slot 34, as opposed to three faces (e.g., front 26 and sides 30, 32). In this manner, the opposing side 30 which is not open to slot 34 can be laid against the ground or within the foot 62 when the docking station is in the upright position.

As an alternative, the foot described in U.S. Pat. No. 5,369,549 to Kopp et al. can be used to support the docking station in a vertical position. The '549 patent is assigned to Hewlett-Packard Company and is hereby incorporated by reference.

The docking station described herein has several advantages. One advantage is that it can be positioned either horizontally or vertically. Due to the dual-sided docking slot, a user can easily dock a portable computer in both the horizontal and vertical positions. Another benefit is that the user can conveniently access modules positioned on the side the portable computer.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A computer docking station for docking a portable computer, comprising:
    an enclosure having a front, a back, a first side and a second side; and
    a docking slot formed in the enclosure to receive the portable computer, the docking slot having a slot front dimension and a slot side dimension, the portable computer having a computer front having a computer front dimension, and a first computer side having a computer side dimension; and
    wherein the entire computer front and the entire first computer side are visible and accessible from the slot front and the slot side when docked, such that the portable computer can be removed from the docking slot from the front of the enclosure and from the first side of the enclosure.

2. A computer docking station as recited in claim 1, wherein the enclosure can be positioned both horizontally and vertically.

3. A computer docking station as recited in claim 1, further comprising an electronic interface port to electronically interconnect with the portable computer when the portable computer is docked.

4. A computer docking station as recited in claim 1, further comprising a circuit board mounted within the enclosure and oriented in a front to back alignment.

5. A computer assembly, comprising:
    a docking station having an enclosure with a front, a back, a first side and a second side, the docking station having a docking slot formed in the enclosure to receive a portable computer, the docking slot having a slot front dimension and a slot side dimension; and
    the portable computer having a computer front having a computer front dimension, and a first computer side having a computer side dimension, the portable computer sized to be received within the docking slot of the enclosure, the portable computer having a compatible electronic interface port which couples to the port of the docking station when the portable computer is docked, and the entire portable computer front and the entire first computer side are visible and accessible from the slot front and the slot side when docked, such that the portable computer can be removed from the docking slot from the front of the enclosure and from the first side of the enclosure.

6. A computer assembly as recited in claim 5, wherein the enclosure can be positioned both horizontally and vertically.

7. A computer assembly as recited in claim 5, wherein the portable computer can be slid into the docking slot at an angle.

8. A computer assembly as recited in claim 5, wherein the docking station has a circuit board mounted within the enclosure and oriented in a front to back alignment.

9. A computer assembly as recited in claim 5, wherein the docking slot has a shallow width and depth in comparison to dimensions of the portable computer so that the portable computer projects from the docking station in both the front and the side directions when docked.

10. A computer docking station as recited in claim 1, further comprising at least one detachable foot sized to attach to the enclosure to support the enclosure in a vertical position.

11. A computer docking station as recited in claim 10, wherein the foot has a guide groove which aligns with the docking slot to guide the portable computer into the enclosure.

12. A computer docking station as recited in claim 1, wherein the slot front dimension is less than the computer front dimension, such that the portable computer project from the enclosure first side.

13. A computer docking station as recited in claim 1, wherein the slot side dimension is less that the computer side dimension, such that the portable computer projects from the enclosure front.

14. A computer docking station as recited in claim 1, wherein the slot front dimension is less than the computer front dimension, and the slot side dimension is less than the first computer side dimension, such that the portable computer projects from the enclosure front and the enclosure first side.

15. A computer assembly as recited in claim 5, wherein the docking station has at least one detachable foot sized to attach to the enclosure to support the enclosure in a vertical position.

16. A computer assembly as recited in claim 15, wherein the foot has a guide groove which aligns with the docking slot to guide the portable computer into the enclosure.

17. A computer assembly as recited in claim 5, wherein the slot front dimension is less than the computer front dimension, such that the portable computer projects from the enclosure first side.

18. A computer assembly as recited in claim 5, wherein the slot side dimension is less that the computer side dimension, such that the portable computer projects from the enclosure front.

19. A computer assembly as recited in claim 5, wherein the slot front dimension is less than the computer front dimension, and the slot side dimension is less than the first computer side dimension, such that the portable computer projects from the enclosure front and the enclosure first side.

* * * * *

UNITED STATES PATENT AND TRADEMARK OFFICE
CERTIFICATE OF CORRECTION

PATENT NO.    : 6,091,602
DATED         : July 18, 2000
INVENTOR(S)   : Jacques H. Helot It is certified that error appears in the above-identified patent and that said Letters Patent is hereby corrected as shown below:

Column 6,
Line 37, "that" should read -- than --;
Line 58, "that" should read -- than --.

Signed and Sealed this

Fourth Day of February, 2003

JAMES E. ROGAN
*Director of the United States Patent and Trademark Office*